(12) United States Patent
Long

(10) Patent No.: US 8,595,381 B2
(45) Date of Patent: Nov. 26, 2013

(54) HIERARCHICAL FILE SYNCHRONIZATION METHOD, SOFTWARE AND DEVICES

(75) Inventor: Byron Long, Toronto (CA)

(73) Assignee: Caseware International Inc., Toronto (CA)

( * ) Notice: Subject to any disclaimer, the term of this patent is extended or adjusted under 35 U.S.C. 154(b) by 535 days.

(21) Appl. No.: 11/980,814

(22) Filed: Oct. 31, 2007

(65) Prior Publication Data

US 2009/0113076 A1 Apr. 30, 2009

(51) Int. Cl.
*G06F 15/16* (2006.01)
*G06F 7/00* (2006.01)
*G06F 17/00* (2006.01)

(52) U.S. Cl.
USPC ........... 709/248; 709/201; 709/218; 707/609; 707/624

(58) Field of Classification Search
None
See application file for complete search history.

(56) References Cited

U.S. PATENT DOCUMENTS

| | | |
|---|---|---|
| 6,625,623 B1 | 9/2003 | Midgley et al. |
| 6,847,983 B2 | 1/2005 | Somalwar et al. |
| 6,901,414 B2 * | 5/2005 | West et al. .............................. 1/1 |
| 7,516,132 B1 * | 4/2009 | Fast et al. ............................... 1/1 |
| 7,657,574 B2 * | 2/2010 | Gupta et al. ........................... 1/1 |
| 2002/0065799 A1 * | 5/2002 | West et al. ......................... 707/1 |
| 2009/0006933 A1 * | 1/2009 | Gavrilov et al. .............. 714/819 |
| 2009/0077044 A1 * | 3/2009 | Krishnaswamy et al. ........ 707/3 |
| 2009/0113412 A1 * | 4/2009 | Shribman et al. ............. 717/170 |

OTHER PUBLICATIONS

"Design, Implementation, and Evaluation of a revision Control System" TICHY, IEEE, 1982, pp. 58-67.

* cited by examiner

*Primary Examiner* — Mohamed Ibrahim
*Assistant Examiner* — Thomas Richardson

(57) ABSTRACT

A method of maintaining a computer file in synchrony between multiple computers is disclosed. The multiple computers may comprise at least one ancestor, a descendant of the ancestor, and a subsequent descendant of the ancestor. A local copy of the computer file may be stored at the ancestor, the descendant and the subsequent descendant and a change log may be maintained at the ancestor, the descendant, and the subsequent descendant, with each change log reflecting changes to local copies of the computer file. The descendant may pass entries in its change log to the subsequent descendant. These entries may be consolidated with the subsequent descendant's change log and may be passed to the ancestor. Changes to the local copies of the computer file at the descendant and the subsequent descendant may be synchronized with the local copy of the file at the ancestor using change log entries received from the subsequent descendant.

23 Claims, 17 Drawing Sheets

50

| | | | | | | |
|---|---|---|---|---|---|---|
| 1. | A0.cvw | | | | | |
| 2. | 16S | | | | | |
| 3. | 0015 | | | | | |
| 4. | FILE | C | GUID_A0.cvw | 0000 | 16S | 0013 T0 |
| 5. | | | | | | |
| 6. | | | | | | |
| 7. | | | | | | |
| 8. | | | | | | |
| 9. | FILE | C | GUID_A0.cvw | 0001 | 16S | 0013 T1 |
| 10. | FILE | C | GUID_A0.cvw | 0002 | 16S | 0013 T2 |
| 11. | ... | | | | | |
| 12. | FILE | C | GUID_A0.cvw | 0015 | 16S | 0013 T15 |

90

| Filename | A0.cvw |
|---|---|
| Cache | Etk2Poy4E7sHGhly+VvQK8 |
| Checksum | DQwF9fiZRITNkqpAoxvJQ9 |
| Oldchecksum | N+7TrAbONxyHGm5q6FhIG |

| | | | | | | |
|---|---|---|---|---|---|---|
| 1. | C0.cvw | | | | | |
| 2. | 18s | | | | | |
| 3. | 0040 | 1302 | 1304 | 1308 | | |
| 4. | A0.cvwptr_A0.cvw | | 16s | sync_pos_A0.cvw | | |
| 5. | FILE | C | GUID_C0.cvw | 0000 | 18s | 0020 T0 |
| 6. | FILE | C | GUID_C0.cvw | 0001 | 18s | 0020 T1 |
| 7. | FILE | C | GUID_C0.cvw | 0002 | 18s | 0020 T2 |
| 8. | ... | | | | | |
| 9. | FILE | C | GUID_C0.cvw | 0020 | 18s | 0020 T20 |
| 10. | FILE | C | GUID_C0.cvw | 0021 | 18s | 0020 T21 |
| 11. | FILE | C | GUID_C0.cvw | 0022 | 18s | 0020 T22 |
| 12. | FILE | C | GUID_C0.cvw | 0023 | 18s | 0020 T23 |
| 13. | FILE | C | GUID_C0.cvw | 0024 | 18s | 0020 T24 |
| 14. | ... | | | | | |
| 15. | FILE | C | GUID_C0.cvw | 0040 | 18s | 0020 T40 |

Rows 5–12: 1300
Rows 13–15: 1310

FIG. 13

1. C1.cvw
2. 13s
3. 0030
4. C0.cvwptr_C0.cvw     18s   sync_pos_C0.cvw
5. A0.cvwptr_A0.cvw     16s   sync_pos_A0.cvw
6. FILE C GUID_C0.cvw 0000 18s 0020 T0
7. FILE C GUID_C0.cvw 0001 18s 0020 T1
8. FILE C GUID_C0.cvw 0002 18s 0020 T2
9. ...
10. FILE C GUID_C0.cvw 0020 18s 0020 T20
11. FILE C GUID_C0.cvw 0021 18s 0020 T21
12. FILE C GUID_C0.cvw 0022 18s 0020 T22
13. FILE C GUID_C0.cvw 0023 18s 0020 T23
14. FILE C GUID_C1.cvw 0001 13s 0040 T50
15. FILE C GUID_C1.cvw 0002 13s 0040 T51
16. FILE C GUID_C1.cvw 0003 13s 0040 T52
17. ...
18. FILE C GUID_C1.cvw 0030 13s 0040 T70

FIG. 14

A0.cvw
16s
0015
FILE  C  GUID_A0.cvw  0000  16s  0013  T0
FILE  C  GUID_A0.cvw  0001  16s  0013  T1
FILE  C  GUID_A0.cvw  0002  16s  0013  T2
...
FILE  C  GUID_A0.cvw  0015  16s  0013  T15
FILE  C  GUID_C0.cvw  0000  18s  0020  T0  ⎫
FILE  C  GUID_C0.cvw  0001  18s  0020  T1  ⎪
FILE  C  GUID_C0.cvw  0002  18s  0020  T2  ⎪
...                                         ⎬ 1501
FILE  C  GUID_C0.cvw  0020  18s  0020  T20 ⎪
FILE  C  GUID_C0.cvw  0021  18s  0020  T21 ⎪
FILE  C  GUID_C0.cvw  0022  18s  0020  T22 ⎪
FILE  C  GUID_C0.cvw  0023  18s  0023  T23 ⎭
FILE  C  GUID_C1.cvw  0001  13s  0040  T50 ⎫
FILE  C  GUID_C1.cvw  0002  13s  0040  T51 ⎪
FILE  C  GUID_C1.cvw  0003  13s  0040  T52 ⎬ 1502
...                                         ⎪
FILE  C  GUID_C1.cvw  0030  13s  0040  T70 ⎭
13S       0030
18S       0023  ← 1506

FIG. 16

```
A0.cvw
16s
0015
FILE  C  GUID_A0.cvw  0000  16s  0013  T0
FILE  C  GUID_A0.cvw  0001  16s  0013  T1
FILE  C  GUID_A0.cvw  0002  16s  0013  T2
...
FILE  C  GUID_A0.cvw  0015  16s  0013  T15
FILE  C  GUID_C0.cvw  0000  18s  0020  T0  ⎫
FILE  C  GUID_C0.cvw  0001  18s  0020  T1  ⎪
FILE  C  GUID_C0.cvw  0002  18s  0020  T2  ⎪
...                                         ⎬ 1501
FILE  C  GUID_C0.cvw  0020  18s  0020  T20 ⎪
FILE  C  GUID_C0.cvw  0021  18s  0020  T21 ⎪
FILE  C  GUID_C0.cvw  0022  18s  0020  T22 ⎪
FILE  C  GUID_C0.cvw  0023  18s  0023  T23 ⎭
FILE  C  GUID_C1.cvw  0001  13s  0040  T50 ⎫
FILE  C  GUID_C1.cvw  0002  13s  0040  T51 ⎪
FILE  C  GUID_C1.cvw  0003  13s  0040  T52 ⎬ 1502
...                                         ⎪
FILE  C  GUID_C1.cvw  0030  13s  0040  T70 ⎭
FILE  C  GUID_C0.cvw  0024  18s  0020  T24 ⎫
...                                         ⎬ 1310
FILE  C  GUID_C0.cvw  0040  18s  0020  T40 ⎭
13S       0030
18S       0040  ← 1506
```

HIERARCHICAL FILE SYNCHRONIZATION METHOD, SOFTWARE AND DEVICES

FIELD OF THE INVENTION

The present invention relates generally to computer file synchronization, and more particularly to computer file synchronization between first, second and third computing devices in which a copy of copy of a file at the third computing device may be used to synchronize with the file at the first computing device.

BACKGROUND OF THE INVENTION

As the use of computing devices has become more common, the need to share data between computing devices, users and geographies has increased. As a consequence, programs and operating systems that allow file synchronization have become commonplace.

File synchronization involves ensuring that two or more remote computing devices contain the same up-to-date data or files. Additions, changes or deletions of a file at one location will cause changes, deletions or additions to the same file at another location thanks to file synchronization. Synchronization may be one-way or two-ways, and may involve monolithic files (such as word processing files, spreadsheets, or the like) or file changes, such as database entries, deltas or the like.

One-way synchronization involves copying data from a source to a target for synchronizing. Two-way synchronization involves copying files in both directions.

Currently, file synchronization is made possible through third party applications such as Microsoft Synchtoy product, Goodsync or similar product. Likewise, synchronization is a feature present in Microsoft Windows Operating system product.

Existing synchronization tools and methods, however, typically allow synchronization between direct copies of files (i.e. between an ancestor and a direct descendant). Copies of copies of files (i.e. subsequent descendants) can typically not be synchronized with the original file or earlier copies of the file.

Accordingly, there remains a need for methods and software that allow hierarchical synchronization in which subsequent descendants (i.e. subsequent copies) may synchronize with earlier ancestors.

SUMMARY OF THE INVENTION

In accordance with an aspect of the present invention, there is provided a method comprising: providing a copy of a computer file from a first computer to a second computer; modifying at the second computer the copy of the computer file to create a modified version of the computer file. A change log is maintained at the second computer reflecting changes resulting from the modifying at the second computer. The modified version of the computer file and entries of the change log at the second computer are passed to the third computer. The method also comprises: modifying at the third computer, the modified version of the computer file, to create a further modified version of the computer file. A further change log is maintained at the third computer reflecting changes resulting from the modifying at the third computer. The method further comprises: at the first computer, synchronizing the computer file with the further modified version of the computer file using entries of the change log at the second computer and the further change log so that the computer file at the first computer includes modifications made at the second computer and the third computer.

In accordance with another aspect of the present invention, there is provided a method of maintaining a computer file in synchrony between multiple computers. The multiple computers comprise at least one ancestor, a descendant of the ancestor, and a subsequent descendant of the ancestor. A local copy of the computer file is stored at the ancestor, the descendant and the subsequent descendant and a change log is maintained at the ancestor, the descendant, and the subsequent descendant. Each change log reflects changes to local copies of the computer file. The method further comprises: receiving at the descendant, entries of the change log reflecting changes to a local copy of the computer file made at the ancestor, and adding the entries to the change log at the descendant; passing from the descendant to the subsequent descendant, entries of the change log at the descendant not yet passed to the subsequent descendant, for addition to the change log at the subsequent descendant. Entries of the change log at the subsequent descendant may be passed to the ancestor, and changes to local copies of the computer file at the descendant and the subsequent descendant, may be synchronized with the local copy of the file at the ancestor using entries of the change log at the subsequent descendant.

In accordance with yet another aspect of the present invention, there is provided a method of maintaining a computer file in synchrony between multiple computers. The multiple computers comprise at least one ancestor, a descendant of the ancestor, and a subsequent descendant of the ancestor. A local copy of the computer file is stored at the ancestor, the descendant and the subsequent descendant and a change log is maintained at the ancestor, the descendant, and the subsequent descendant. Each change log reflects changes to local copies of the computer file. The method further comprises: receiving at the ancestor entries of the change log at the subsequent descendant, including changes to local copies of the computer file at the descendant and the subsequent descendant, so that the local copy of the file at the ancestor may be synchronized with the local copy of the descendant and the subsequent descendant using entries of the change log at the subsequent descendant, and where entries of the change log at the descendant have been passed to the subsequent descendant, for addition to the change log at the subsequent descendant.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

FIG. 12 is an exemplary ancestor file's synchronization log having a plurality of the file log entries of FIG. 9;

FIG. 13 is an exemplary synchronization log for a file that is a child of the ancestor file of FIG. 12;

FIG. 14 is an exemplary synchronization log for a file that is a child of the child of the ancestor file (i.e. the grandchild of the ancestor file) of FIGS. 12 and 13;

FIGS. 16A and 16B are the ancestor file's synchronization log of FIG. 12 updated by the grandchild file's synchronization log of FIG. 14;

FIGS. 17A and 17B are the ancestor file's synchronization log of FIG. 12 subsequently updated by the child file's synchronization log of FIG. 13;

FIG. 18 is a flow diagram depicting the synchronization log exchange software component of FIG. 3 sending a log entry to another synchronization log, such as the log entry of FIG. 9 or 10;

DETAILED DESCRIPTION

Figure 1:
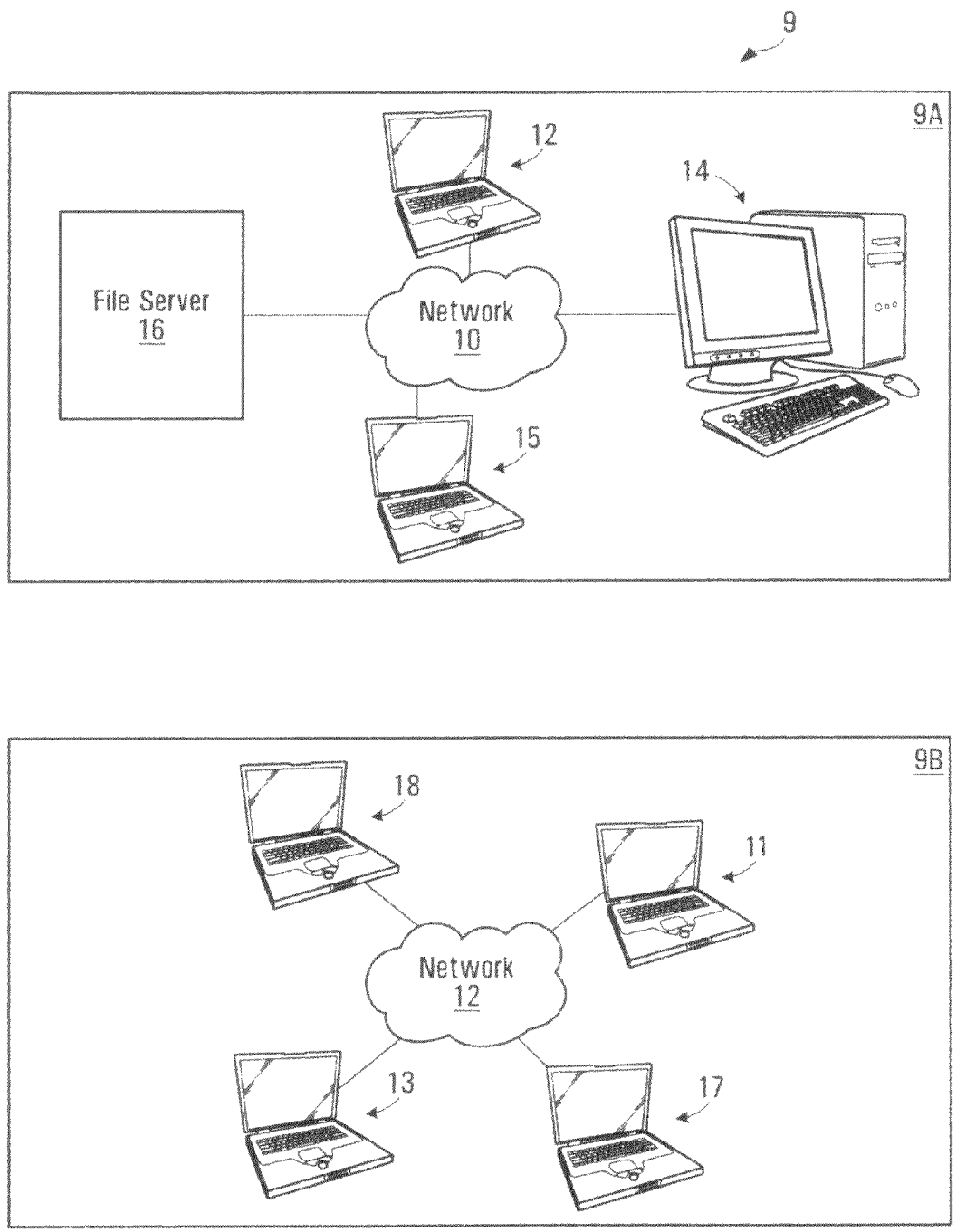
FIG. 1 is a simplified block diagram of a computing environment, including two computing locations, allowing file synchronization in manners exemplary of embodiments of the present invention.

FIG. 1 depicts a computing environment 9, exemplary of embodiments of the present invention. Exemplary computing environment 9 is distributed across two physical locations, locations 9a and 9b.

A file server 16 and computing devices 12, 14 and 15 may be located at location 9a and interconnected to each other by way of computer communications network 10. Network 10 may be a local area network or a wide area network. Network 10 may be any suitable computer communications network, such as an Ethernet, a packet switched, token ring, or other computer communications network, known to those of ordinary skill.

File server 16 may be a conventional network file server, and may take the form of a conventional micro-computer, mainframe, or mini-computer, hosting a suitable operating system such as, a Linux, Microsoft Windows NT, Vista, Apple OSX, Novell NetWare, or similar file server with a processor, memory, one or more persistent memory storage devices in the form of hard disks or other data storage devices, various application software and a network adapter for connecting file server 16 to network 10. File server 16 may also take the form of network-attached storage. A file repository may be stored on the persistent storage memory of file server 16. File server 16 under control of its operating system (and optionally application software) may provide a copy of a file in the file repository upon a request from computing devices 12, 14 or 15, over network 10. As will be appreciated, any number of computing devices and any number of file servers may be connected to network 10. It may further be appreciated that a file in the context of this disclosure may be a structured block of data on a storage medium such as a disk drive.

Location 9b may be, but need not necessarily be, physically remote from location 9a. At location 9b, computing devices 11, 13, 17 and 18 may be interconnected to each other by way of computer communications network 12. Network 12 may again be a local area network, a wide area network or a wireless ad hoc network, and may be distinct from network 10 such that data may not flow between the two networks. It may similarly be appreciated that any number of interconnected computing devices may be located at location 9b.

Figure 2:
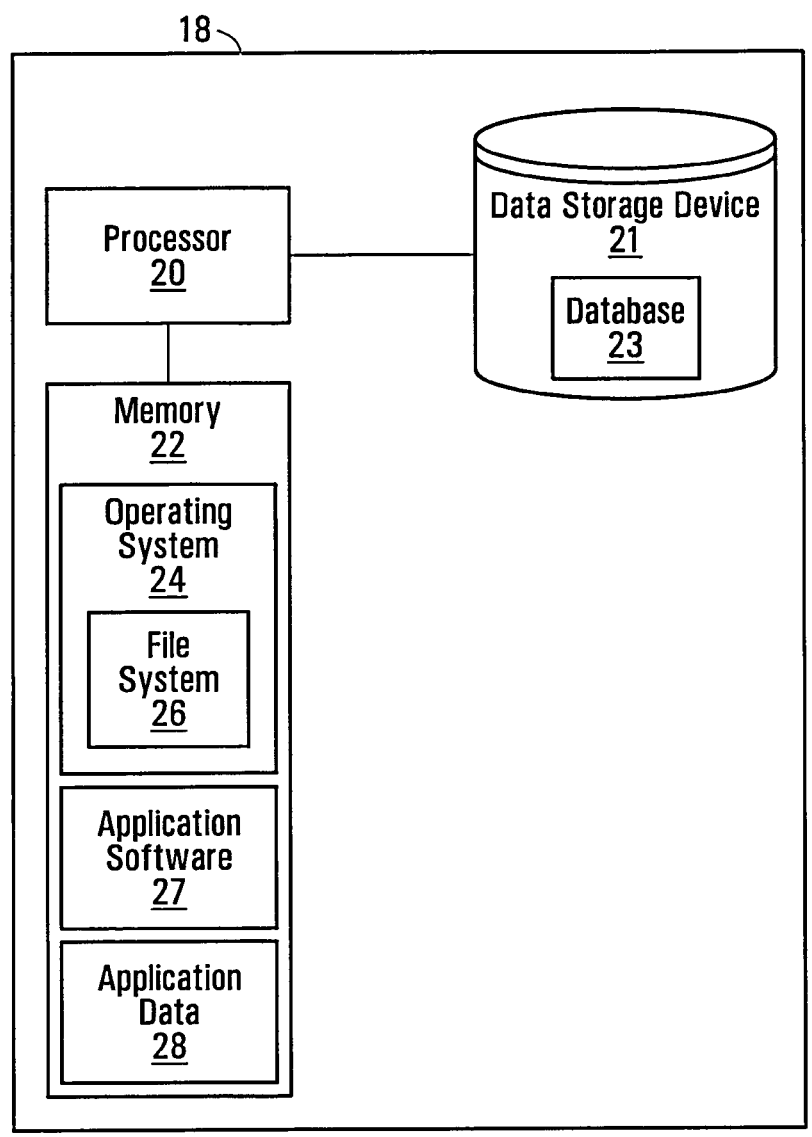
FIG. 2 is a simplified block diagram of a computing device in the computing environment of FIG. 1.

As illustrated in FIG. 2, each of computing devices 11, 13, 12, 14, 15, 17 and 18 may be a conventional computing device, such as, for example, a desktop personal computer, a server, a laptop, or the like. Specifically, FIG. 2 depicts select components of computing device 18 (it may be appreciated that devices 11, 13, 12, 15, 17 and 14 may contain similar components). As illustrated, device 18 may include a processor 20, a data storage device 21 and memory 22 hosting operating system 22, such as Windows XP, Vista, Linux, or Apple OSX, application software 27 and application data 28. Processor 20 may execute instructions from application software 27 and operating system 24. During execution, application software 27, which may include a word processing program, spreadsheet program, or database management system software, may generate application data 28. Moreover, operating system 24 may host a file system 26 that in conjunction with data storage device 21 organizes and stores data files on device 18.

Figure 3:
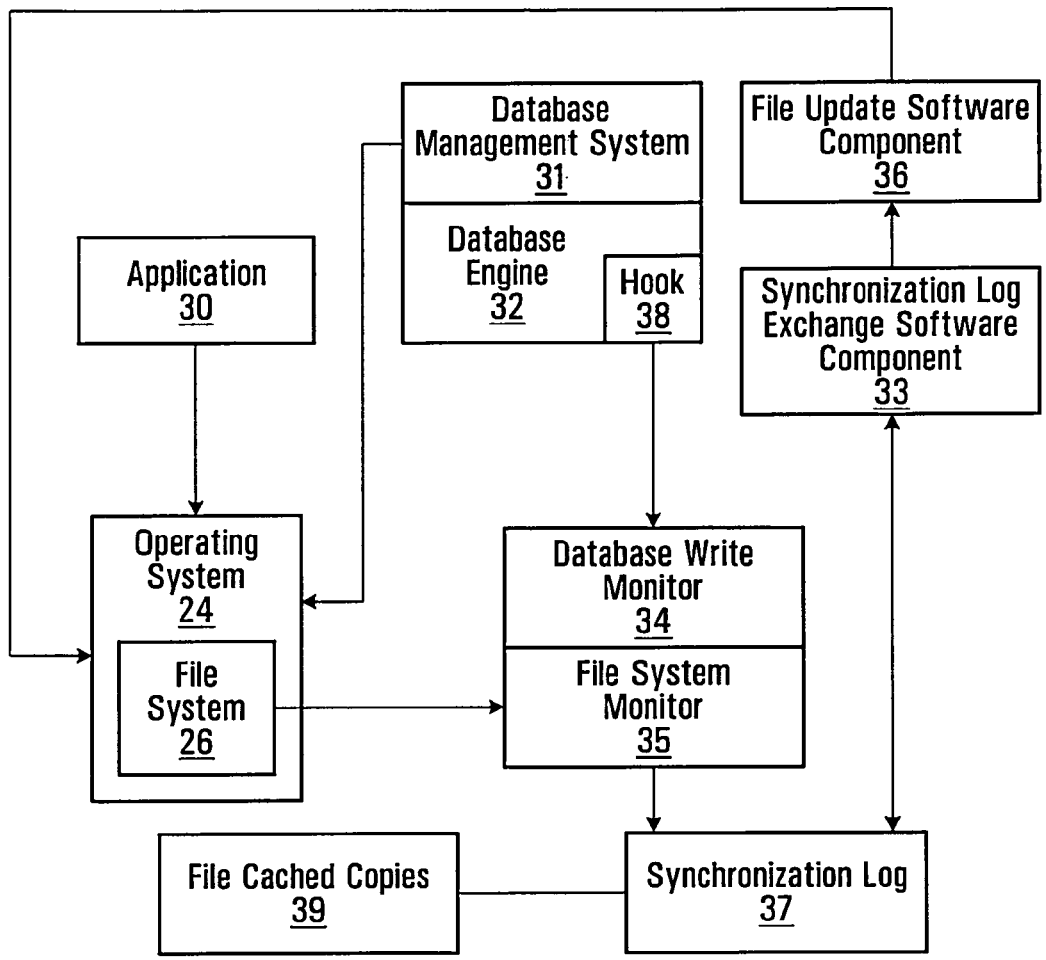
FIG. 3 is a block diagram depicting the contents of temporary and persistent memory storage of the device of FIG. 2.
Figure 4:
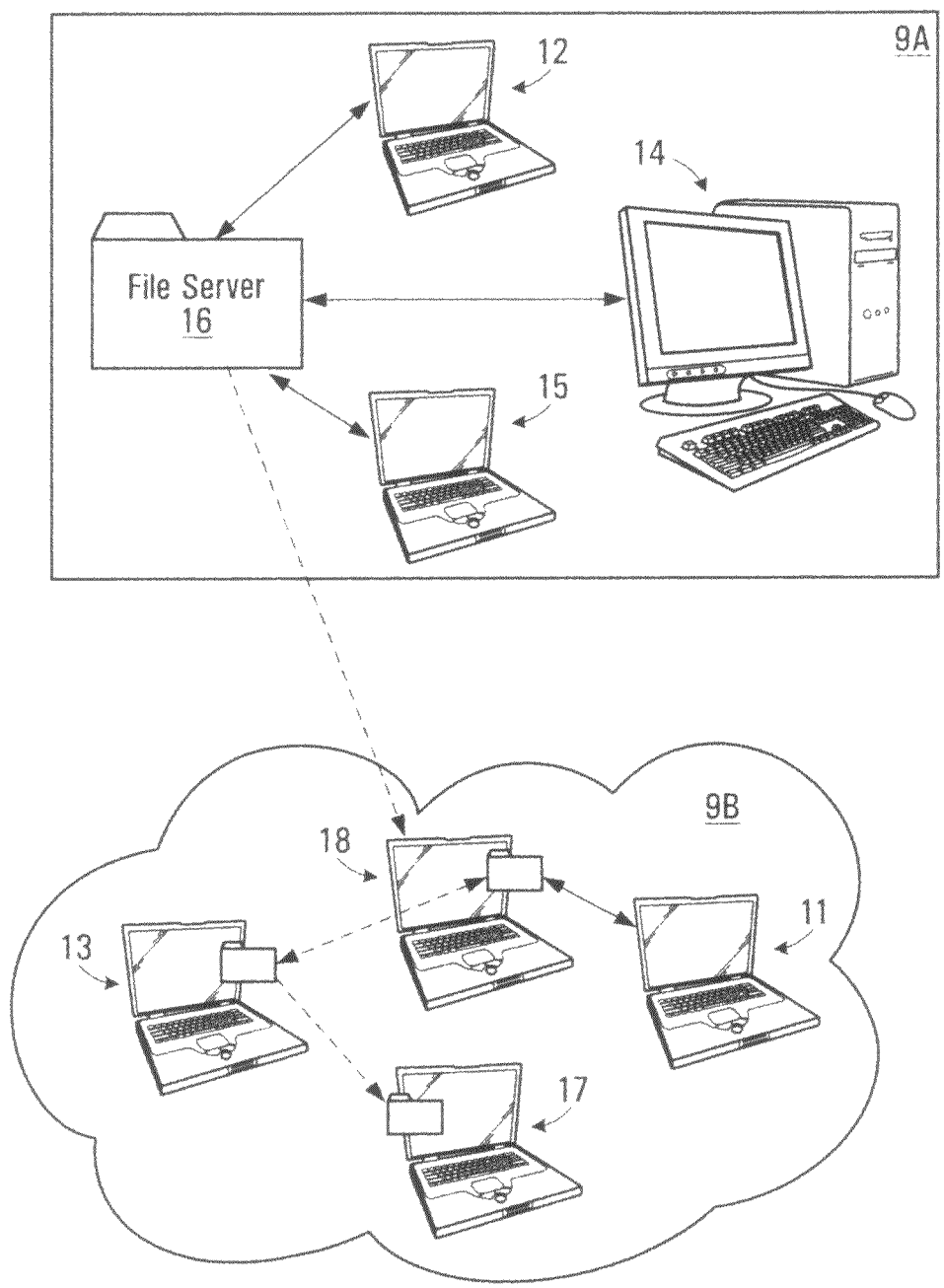
FIG. 4 is a schematic diagram illustrating the relationship between files in the computing environment of FIG. 1.

Turning in more detail to file system 26, as illustrated in FIG. 3, an exemplary application, application 30, may, during execution, write data to data storage device 21. For example, application 30 may be a word processing application such as Microsoft Word or similar application which allows a user to create, edit and save a file, in a manner understood by those of ordinary skill. Thus, to write to a given file, application 30 may issue one or more write commands to operating system 24, which may in turn write to file system 26 on data storage device 21.

Memory 22 may further host database management system software 31, including a database engine 32 that manages a database 23 stored on data storage device 21. Database engine 32 may be used to create, retrieve, update and delete data from database 23, in a manner understood by those of ordinary skill. Database management system 31 may be a relational database management system, or an object oriented database management system. Known database management systems include, for example, Oracle™, MicrosoftSQL™, and xBase database systems.

Notably, and as will be further described below, memory 22 also hosts a database write monitor 34, a file system monitor 35, a file update software component 36, a synchronization log exchange software component 33, exemplary of embodiments of the present invention. As will become apparent, database write monitor 34, and file system monitor 35 create and maintain synchronization logs 37, that track changes to monitored files and databases. Tracked changes may be logged and used to synchronize monitored files (including databases) with copies of such files at other computing devices.

In manners exemplary of embodiments of the present invention, database write monitor 34 and file system monitor 35 may operate as a background application (or daemon) (e.g. an application that does not run under user-control) that monitors and logs changes to file system 26 and database engine 32 in synchronization log 37. As further detailed below, file update software component 36, synchronization log exchange software component 33 and synchronization log 37 may operate in conjunction with database write monitor 34 and file system monitor 35 to keep monitored files at two computing devices in synchrony.

More specifically, file system monitor 35 may monitor a file in file system 26 to determine when a monitored file has been modified. If file system monitor 35 determines that a monitored file has been modified, it may generate an entry associated with the file in synchronization log 37. The entry may identify the modification such that file update software component 36 may later read the entry and possibly replicate the modification at another computing device. Of interest, file system monitor 35 may monitor files in their entirety. If any monitored file is changed, an identity of the file may be logged. As well, a copy of a modified monitored file may be cached at discrete points in time and may be stored on a device. The purpose of these cached copies will become apparent below.

Database write monitor 34 may similarly log changes to database 23 each time database engine 32 writes to database 23. To this end, database engine 32 may contain a software hook 38 that detects low level write commands. When such a command is detected, database write monitor 34 may be signalled, and the command and associated data may be passed to database write monitor 34. Database write monitor 34 may then generate an entry in synchronization log 37, identifying changes to records of database 23. All or part of synchronization log 37 may be temporarily stored in memory 22 but may be written out to storage device 21 for persistent storage. Conveniently, changes to individual records of tables of database 23 may be logged in synchronization log 37. As will become apparent, database write monitor 34 monitors and logs changes to database 23 at the field/record level.

Synchronization log exchange software 33 may exchange synchronization log 37, or portions of such a log, generated by database write monitor 34 and/or file system monitor 35 and/or exchange log entries between two synchronization logs at two different computing devices as further detailed below. By exchanging entries in log 37, changes to a monitored file, logged in log 37 may be applied at another computing device and to another copy of the monitored file, using update software 36.

In this manner, the contents of a file at two locations may be kept in synchrony through the exchange and application of entries logged in their respective synchronization logs 37 by their respective file system monitors 35 or database write monitors 34.

Conveniently, computing environment 9 allows hierarchical synchronization of files and databases stored at location 9a with modified copies of these files and databases used at location 9b (or other locations not shown) in manners exemplary of embodiments of the present invention.

Figure 5:
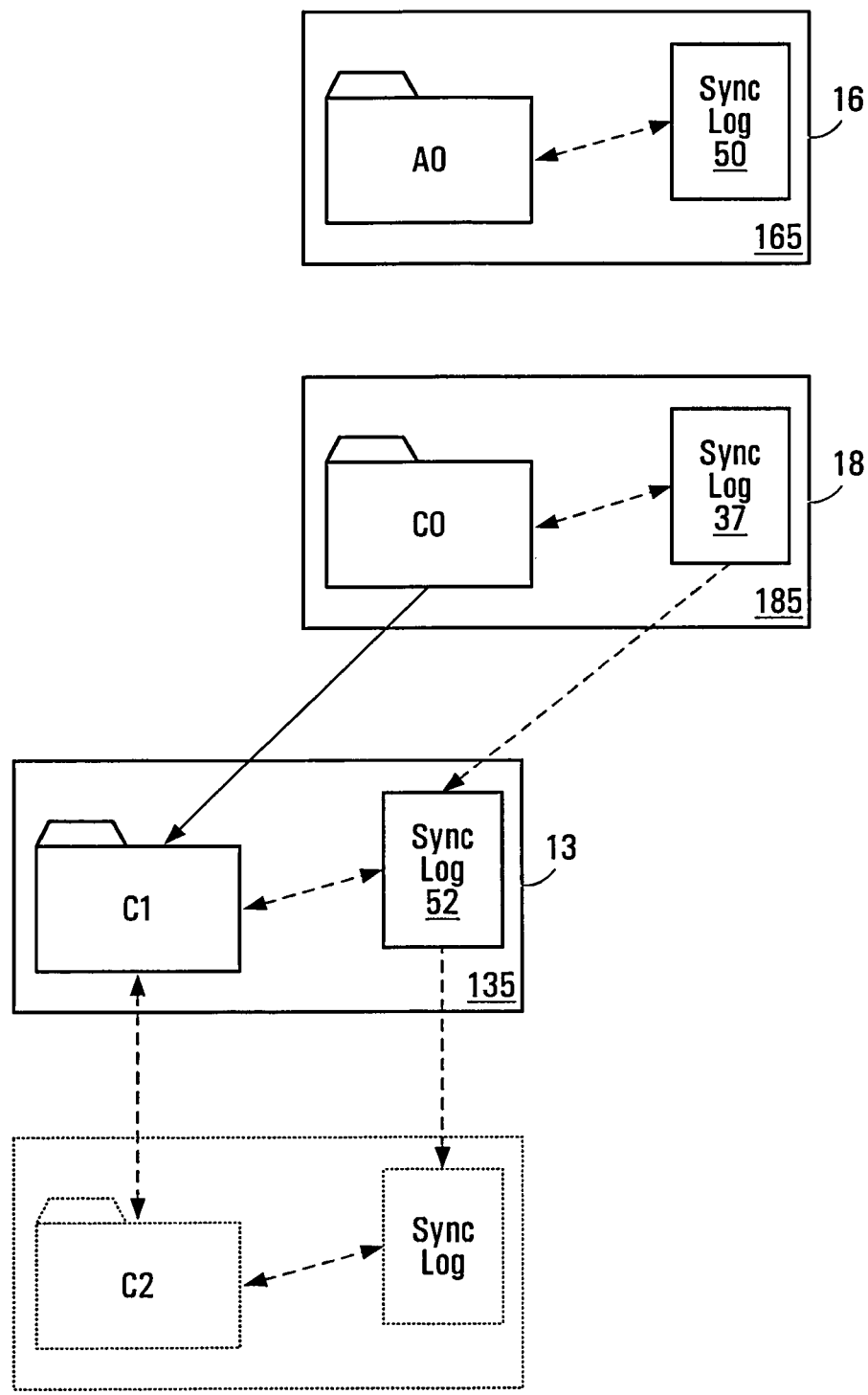
FIG. 5 is a schematic diagram illustrating the hierarchical relationship between the files of FIG. 4.
Figure 6:
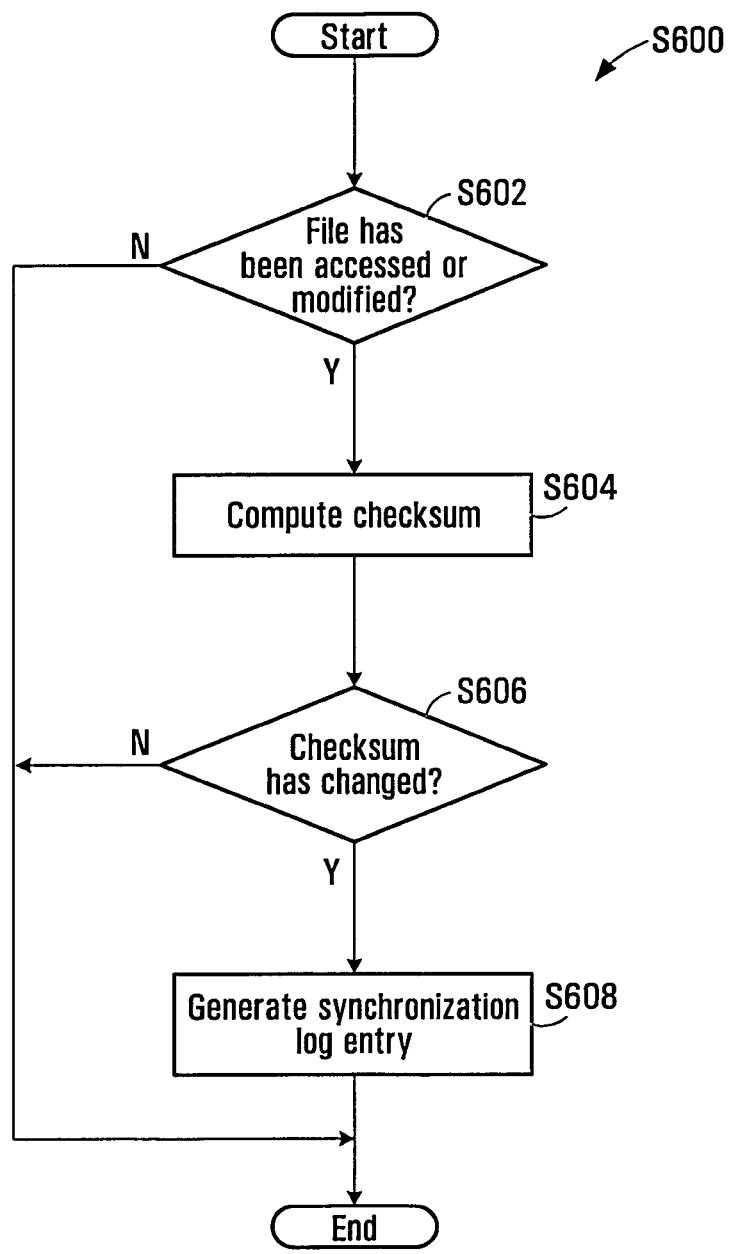
FIG. 6 is a flow diagram depicting operation of the file system monitor of FIG. 3.
Figure 7:
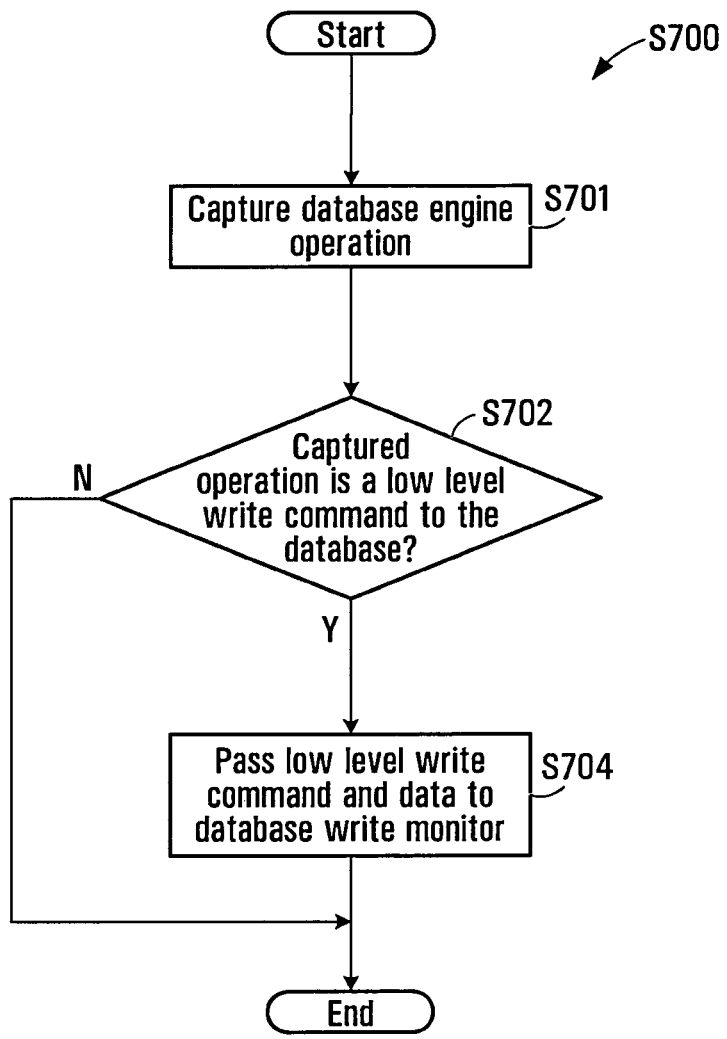
FIG. 7 is a flow diagram depicting operation of the hook in the database engine of FIG. 3.
Figure 8:
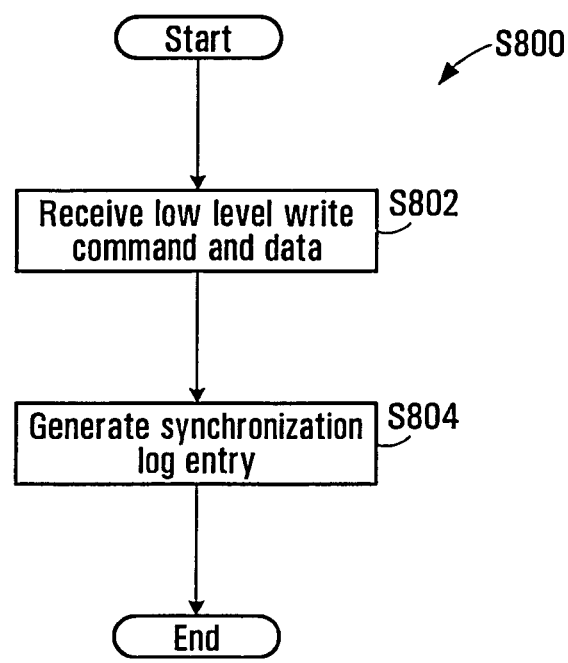
FIG. 8 is a flow diagram depicting operation of the database write monitor of FIG. 3.

Specifically, as best appreciated with reference to FIG. 5, users may obtain copies of a file or files identified as A0, directly or indirectly. For example, a copy of a A0 at a first computing device (e.g. file server 16) at location 9a may be stored and modified locally as a local copy C0 on a second computing device such as computing device 18—device 18 thus becomes a descendant of the first computing device. However, it may be desired to synchronize local copy C0 to local copy A0 so that A0 is kept in synchrony with local copy C0. Possibly, the user of second device 18 may disconnect from network 10 after he or she obtains copy C0 and while he or she makes changes to copy C0. For instance, the user of second device 18 may take device 18 to location 9b where he or she makes changes to file C0. These changes to C0 may be captured by file system monitor 35 or database write monitor 34 running on device 18 and logged in its synchronization log 37.

Further, a change log 50 is maintained at the device hosting file A0. The change log may reflect changes to A0, and may or may not be empty when copy C0 is made. If change log 50 is empty, it need not be provided to the descendant second computing device 18. If, however, change log 50 includes entries, these may be provided to the descendant with file C0.

As will be appreciated, A0, C0, etc. and changes thereto are described herein with reference to a single file. A0, however, may actually represent one or multiple files. The multiple files may be associated by directory, folder, content, client or the like. Individual files in A0, C0, etc. may further be identified by file name as set out below.

The user of second computing device 18 may later again communicate with network 10 (for example, may return to location 9a) and thus its ancestor, e.g. file server 16. At this point computing device 18 may desire to update A0 at file server 16 with the changes made to local copy C0. To this end, entries in synchronization log 37 reflecting the changes made to local copy C0 may be applied to local copy A0. Further, in the presence of changes to A0 made after copy C0 was obtained, changes to A0 contained in synchronization log 50 may be added to C0's synchronization log 37. Upon a triggering event, newly added non-conflicting changes to C0 may be applied to file A0. At this point, assuming no conflicts, or after any conflicts have been resolved, files A0 and C0 may be considered to be in synchrony.

Alternatively, instead of modifying file C0 in isolation, a user of device 18 may be part of a team working at location 9b. Another team member may choose to take a local copy C1 of file C0 from device 18 and store it locally on his or her computer. Exemplary of an embodiment of the present invention, a user of third computing device, such as device 13 may take a local copy of file C0 from second device 18 along with a copy of C0's synchronization log 37, over network 12, and store it locally on third device 13 as copy C1 and synchronization log 52. Immediately after copying C0, synchronization log 52 will contain entries copied from synchronization log 37. Changes subsequently made to copy C1 on device 13 may also be logged in synchronization log 52.

Moreover, it may be desired that file A0 at location 9a be kept in synchrony with copy C1. To this end, the user of third device 13 may return to location 9a and communicate with network 10 in order to update copy A0. A0 may be updated with C1 in a manner as previously described. That is, entries in C1's synchronization log 52 may be added to A0's synchronization log 50 and upon a triggering event, non-conflicting entries in synchronization log 50 (now including entries in synchronization log 52) may be applied to A0. Assuming no conflicts, or after any conflicts have been resolved, A0 and C1 may be considered to be in synchrony.

Significantly, if A0 is synchronized with copy C1 before copy C0 is synchronized with A0, changes made to both C0 and C1 may be imported into copy A0's synchronization log 50 via copy C1's synchronization log 52. This occurrence is the result of synchronization log 52 inheriting some entries from C0's synchronization log 37 upon its creation (i.e. when synchronization log 37 was copied over into synchronization log 52).

In the event second computing device 18 hosting copy C0 re-establishes communication with network 10 after third computing device 13, subsequent non-conflicting changes made to C0 (logged in C0's synchronization log 37) after C0 was copied to copy C1 may also be added to A0's synchronization log 50 and applied to A0. However, changes to C0 that have already been logged in A0's synchronization log 50 via copy C1's synchronization log 52 need not be re-added to synchronization log 50.

C1 may similarly again be synchronized with C0, once C1 is again in communication with C0. For example, if a computing device 13 hosting C1 is again interconnected with computing device 18 hosting C0, entries of synchronization log 52 may be added to synchronization log 37, and entries of synchronization log 37 may be added to synchronization log 52. Non conflicting entries of synchronization logs 37 and 52 may be applied at C0 or C1, as appropriate.

In order to explain the hierarchical relationship between computing devices in the computing environment 9 of FIG. 1, a computer hosting a file that is a copy or is derived from a copy of a file to which it is to be synchronized is referred to as a descendant of the computer hosting that file. Conversely, any computing device hosting a file from which a descendant file is derived is referred to as an ancestor of the descendant. For ease of explanation, files are also referred to as ancestors and descendants of each other to explain their interrelationship. So, C0 is a descendant of A0. And A0 is an ancestor of C0. Likewise C1 is a descendant of C0 and A0. And A0 and C0 are ancestors of C1. C1 may further be described as a subsequent descendant of A0. Descendants of C1 may also be described as subsequent descendants to A0.

As will become apparent, other permutations of file synchronization are possible. For example, copy C1 may be copied as copy C2, and changes to C2 (and thus C0 and/or C1) may be synchronized with A0. Alternatively, changes to C2 could be applied to C0 or C1, thereby synchronizing C2 with C0 or C1. Effectively then, hierarchical synchronization exemplary of embodiments of the present invention, allows modifications to any subsequent descendant—C1, C2, etc.—of a copy (C0) of a file (A0) to be synchronized to any earlier ancestor—C0, C1, etc.—of the file, or the original file A0. In other words, synchronization need not occur between direct descendants, but may be effected between an ancestor and its subsequent descendants.

Components of the computing environment 9, allowing hierarchical synchronization described above, are further described below in conjunction with FIGS. 6 to 20.

As previously explained, to allow hierarchical synchronization, as shown in FIG. 5, each of A0, C0, C1 and C2 may have associated with it a synchronization log. Specifically, a change log is maintained at each ancestor, each descendant, each subsequent descendant, and the like. For example, synchronization log 50 is maintained to reflect logged changes to file A0, log 37 is maintain to reflect logged changes to file C0 and log 52 is maintained to reflect logged changes to file C1 as logged by the respective file system monitors 35 on the respective computing devices hosting copies C0, C1, etc. Moreover, as previously explained a log (e.g. log 52) may contain some entries inherited from a log (e.g. log 37) of logged modifications of another local copy of the file. Log 52 may further contain entries corresponding to logged modifications to file C1. Entries inherited from log 37 and entries corresponding to modifications to file C1 may be consolidated in log 52, or may alternatively be separated into two log files. For example, log 52 may contain entries relating to modifications to file C1 only and another log 52' may contain the entries inherited from log 37. Other methods of maintaining log 52 so that entries inherited from log 37 may be passed back to A0, if desired, may be apparent to one of ordinary skill.

Turning in more detail to file system monitor 35, flow diagram S600 (FIG. 6) depicts the operation of file system monitor 35 (FIG. 3). When running, file system monitor 35 may continually monitor file system 26 to determine if a monitored file has been accessed or modified (S602). A monitored file may be identified by file name in a configuration file, or otherwise. Monitored files may be identified by end-users as such, or may be hard-coded into file system monitor 35. As may be understood by a person of ordinary skill, numerous methods of determining whether a file has been modified exist. For example, the time stamp of monitored file may be monitored for change. Upon detecting a change in the timestamp, a checksum for the file may be generated (S604) using for instance, a checksum algorithm such as Message-Digest algorithm 5 (MD5), or the like. File system monitor 35 may then determine whether the checksum has changed (S606), i.e. determines whether the new checksum is different from the previous checksum. If the checksum remains the same then no entry is created in the synchronization log since the file remains unchanged. However, if the checksum has changed, file system monitor 35 may generate an entry in synchronization log 37 (S608). The entry may be appended to synchronization log 37. Thus, as will be further detailed below, a synchronization log may contain a list of entries, with each entry corresponding to a logged modification to a monitored file.

Additionally, a copy of the most recently updated version of the monitored file is copied and saved locally. In this way, synchronization log 37 tracks changes to the file, while a copy of the most recent version of the file is available.

Modifications to database 23 (FIG. 2) may be logged as detailed in flow diagram S700 (FIG. 7) describing operation of software hook 38 in database engine 32 (FIG. 3) and flow diagram S800 (FIG. 8) describing operation of database write monitor 34.

Specifically, software hook 38 signals database write monitor 34 each time a monitored database is updated. Again, the database to be monitored may be identified in a configuration file or in the software hook or database write monitor 34. As may be appreciated by a person of ordinary skill, software hook 38 may be a piece of software code inserted into the software code for database engine 32, to, for example, signal certain function calls to database write monitor 34. In this instance, hook 38 may be invoked upon, or may capture, an operation sent to database engine 32 from database management system 31 (S701). Hook 38 may then determine whether the operation is a low level write command to database 23 (S702). If it is, hook 38 may pass the write command to database write monitor 34 along with the data that is to be written to database 23 (S704). It may be appreciated that a low level write command may be a command that changes one or more fields of a particular database record. A low level write command may also be a "delete record" or "insert record" command. In the case of an insert, the field changes may include the initial values of non-blank fields.

Upon receiving a low level write command and associated data (FIG. 8, S802), database write monitor 34 generates a synchronization log entry in synchronization log 37 (S804). An entry in synchronization log 37 corresponding to a modification to database 23 may contain an indication of the which record is being changed, the changed field of the record, the new value of the modified data in database 23 and the action taken (e.g. insert, delete, change).

Figure 9:
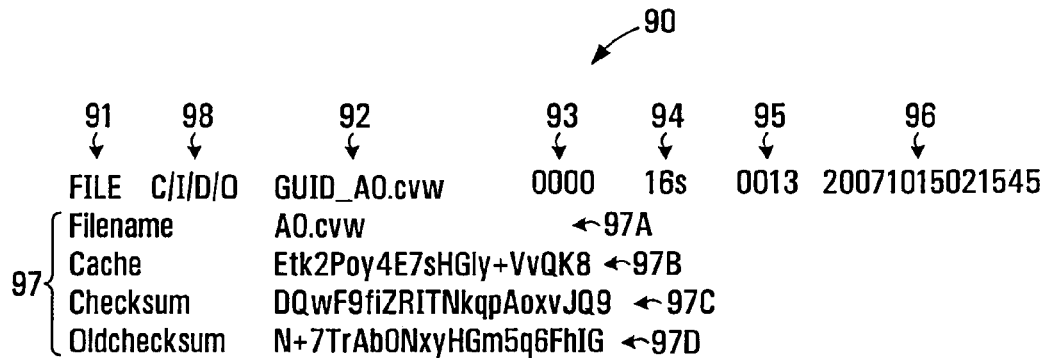
FIG. 9 illustrates an exemplary format of a file log entry used to synchronize copies of a file in manners exemplary of embodiments of the present invention.

The format of an exemplary synchronization log entry 90 for a file A0 is shown in FIG. 9. As illustrated, file A0 has extension .cvw; however, it may be appreciated that file A0 may have other extensions. The significance of filename extensions are well known in the art. More specifically, synchronization log entry 90 may have the following fields: file change identifier 91; operation identifier 98; Global Unique Identifier (GUID) 92; sequence number 93; session identifier 94; user identifier 95; and timestamp 96. Moreover, log entry 90 may also have file change parameters 97 consisting of: filename 97a; cache value 97b; checksum value 97c; and oldchecksum value 97d.

File change identifier 91 may be a fixed value indicating that the associated log entry is a file change rather than a database change.

Operation identifier 98 may identify the type of modification to the monitored file. Operation identifier 98 may be a change (indicated by the value "C"), an insert (indicated by the value "I"), a delete (indicated by the value "D") or other (indicated by the value "O").

GUID 92 may be a value that uniquely identifies a file or a database. For example, the Windows NT or Vista operating system and various Windows applications may produce a 128-bit value that uniquely identifies a particular component such as a file or database. In exemplary log entry 90, GUID 92 may uniquely identify file A0. (As illustrated, in FIG. 9, GUID 92 has the value "GUID_A0.cvw", however, it may be appreciated that this is merely to enhance comprehension for the purposes of this disclosure. In reality, the value of GUID 92 may be a 128-bit value.)

Session identifier 94 may identify which local copy of a monitored file, such as file A0, C0, C1, etc. was modified. Returning to FIG. 5, it may be considered that session 16S represent changes made to local copy A0. These changes may have been logged to A0's log 50 by file system monitor 35 or database write monitor 34 running on device 16. Similarly, session 18S and 13S identify changes to local copy C0 and C1 on devices 18 and 13 respectively. Thus, as illustrated in FIG. 9, the modification that generated exemplary log entry 90 was to local copy A0 (indicated by the value 16S of session identifier 94).

Significantly, session identifier 94 may be assigned per local copy of a file (e.g. A0, C0, C1) and may be unique. A new session identifier may be generated from the CRC of the GUID of the local copy (i.e. by the application of a cyclic redundancy check on the file's GUID). Other methods known to persons of ordinary skill in the art may be employed to achieve uniqueness of session identifiers. Effectively, session identifier 94 may then be used to identify the source (e.g. computer, etc.) of any logged change.

Sequence number 93 may indicate the index of the modification among all modifications to file A0 for a session 16S in its log. Sequence number 93 in log entry 92 has the value 0000, indicating that log entry 92 was the first logged modification to file A0 for session 16S. Significantly, each sequence number associate with a session may also be unique (e.g. the sequence number may be incremented for each logged modification to file A0 during a session).

User identifier field 95, having the value 0013, may further identify the user responsible for the change. That is, in FIG. 9, user 0013 was responsible for making the change that resulted in file change monitor 35 generating log entry 90.

Timestamp 96 may identify the date and time of the modification. As illustrated, the date and time is represented in UTC format (i.e. Coordinated Universal Time). Of course, any other form of timestamp may be used.

File change parameters 97 are relevant to a changed file, other than a database. File change parameter 97 may include the following: filename 97a; an identifier of a cached copy of the monitored file 97b corresponding to the change log entry; a checksum value 97c; and an oldchecksum value 97d.

As may be apparent by now, filename 97a is the name of the file to which the synchronization log entry belongs. That is, exemplary log entry 90 represents a modification to file A0.cvw.

After file A0 is modified at a first device, a compressed copy of it may be created and kept by file monitor software 35. This copy may subsequently be sent to another device. The receiving device may decompress the cached copy and thereby obtain a copy of the file. As illustrated, the value of the cache field 97b is an identifier of this cached copy and is represented in base-64. Methods of creating a cached copy of a file at a point in time (in this case, at the time specified by timestamp 96) and later decompressing the cached copy are well known in the art.

Lastly, the checksum 97c and oldchecksum 97d fields contain the value of the file checksum after the logged modification (i.e. at the time of timestamp 96) and the value of the file checksum after the modification previous to the current modification, respectively. As illustrated, the checksum and oldchecksum values are also represented in base-64.

In sum, exemplary log entry 90 was created by file system monitor 35 after the first change made to file A0.cvw having session identifier 16S by user 0013 at time 21:54:45 on 2007 Oct. 15. A cached copy of file A0.cvw at time 21:54:45 on 2007 Oct. 15 is stored as file Etk2Poy4E7sHGhly+VvQK8. The checksum of file A0.cvw before the modification was N+7TrAb0NxyHGm5q6FhlG, and post-modification at time 21:54:45 on 2007 Oct. 15 was DQwF9fiZRITNkqpAoxvJQ9. Significantly, to prevent an accumulation of a plurality of cached copies of the monitored file over time, only the cached copy of the file associated with the last log entry for each local copy may actually be kept.

Figure 10:
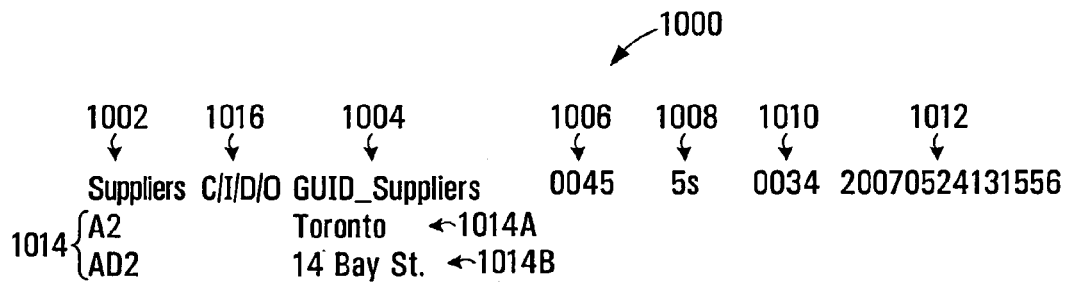
FIG. 10 illustrates an exemplary format of a database log entry used to synchronize copies of a database in manners exemplary of embodiments of the present invention.

A synchronization log entry generated by database write monitor 34 differs slightly from a log entry generated by file system write monitor 35. FIG. 10 shows an exemplary database log entry 1000. Log entry 1000 may have the following fields: database identifier 1002; operation identifier 1016; the database record GUID 1004; sequence number 1006; session identifier 1008; user identifier 1010; and timestamp 1012. Database log entry 1000 may further have field level change identifiers 1014.

Operation identifier 1016, GUID 1004, sequence number 1006, session identifier 1008, user identifier 1010 and date and time 1012 substantially serve the same purpose as in a file synchronization log entry (e.g. exemplary file log entry 90), and have been described previously.

Database identifier 1002 may identify the name of the database that is monitored by database write monitor 34, in this example, an exemplary "Suppliers" database.

Field level change identifiers 1014 may identify the field of a changed record and the new value of the field. For instance, field change identifier 1014a specifies that the value of field A2 in the "Suppliers" database was changed to "Toronto" and the value of field AD2 was changed to "14 Bay St." (1014b).

In sum, database log entry 1000 specifies that the values of fields A2 and AD2 of record GUID_Suppliers in the Suppliers database were changed to "Toronto" and "14 Bay St." respectively by the 0045$^{th}$ modification to the "Suppliers" database with session identifier 5S by user 0034 at time 13:15:56 on 2007 May 24.

As should now be apparent, entries of log 37 may each identify a change to a local copy of a file (e.g. A0, C0, C1, etc.) that may be an application created data file, or the like, or a database, or a combination of such files. In the case of a non-database file the entry identifies the file, its new checksum, and previous checksum. If stored, a cached version of the file having the new checksum is identified. In the case of a database file, the database and changed field/record and change are logged.

As will become apparent below in connection with the discussion of how the entries in a synchronization log may be exchanged and applied to a file, or database, a log entry, and hence, a modification to a file or database, may be uniquely identified by a combination of its session identifier and sequence number.

Figure 11:
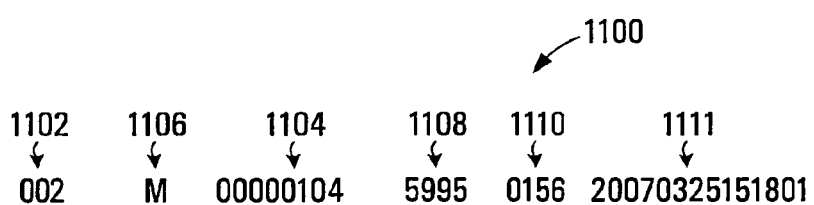
FIG. 11 illustrates an exemplary format of a message operation used to synchronize copies of files or copies of databases in manners exemplary of embodiments of the present invention.
Figure 15:
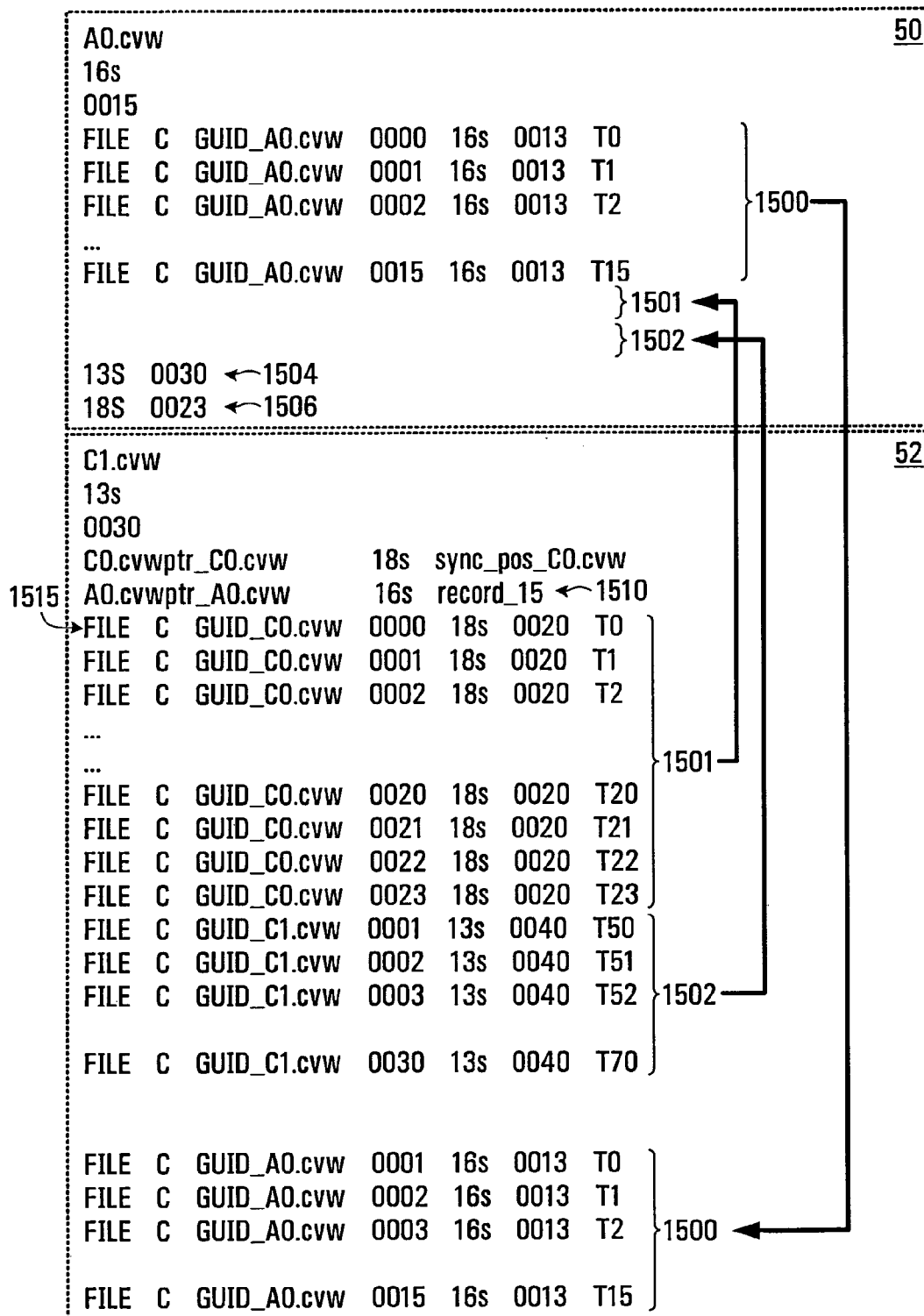
FIGS. 15A and 15B are schematic diagrams depicting the exchange of log entries between the synchronization log of FIG. 12 and the synchronization log of FIG. 14.

In addition to a database change log entry and a file change log entry, a synchronization log may have a third type of entry, a message log entry. FIG. 11 illustrates the format of an exemplary message log entry 1100. Message log entry 1100 may have the following fields: a message type 1102; an operation identifier 1106 an argument 1104, session identifier 1108, user identifier 1110, and timestamp 1111.

Session identifier 1108, user identifier 1110 and timestamp 1111 have been previously discussed above in connection with a database change log entry and a file change log entry.

Message log entry 1100 may be an instruction to file update software 36 to execute a particular function. Message log entry 1100 is identified as such by operation identifier 1106 (having the value "M"). The function may be specified by message type 1102 (in this example, having the value 002) and the argument 1104 to the function (having the value 00000104). Example functions that may be invoked are retotalling operations (e.g. for numeric database records), state changes (e.g. updating the database schema) and update bracketing (e.g. for grouping interdependent log entries together in a log).

Having discussed the format of three types of synchronization log entries, exemplary synchronization logs having a plurality of these entries are discussed next in conjunction with FIGS. 12-16.

FIG. 12 depicts the contents of synchronization log 50 for file A0 (residing on device 16) and having session identifier 16S. FIG. 12, line 1 contains the filename of the file with which log 50 is associated, namely, A0.cvw. Line 2 contains the session identifier, 16S. Line 3 indicates the last known sequence number of a modification having session identifier 16S). It may be recalled that sequence numbers are incremented with each logged modification associated with a session. The first entry in log 50 (lines 4-8) is exemplary log entry 90 (FIG. 9). For ease of comprehension, hereinafter, only the first line of each log entry will be shown with an abridged timestamp. The second, third, and fifteenth entries in log 50 are found on lines 9, 10 and 12 of FIG. 12. Thus, as illustrated, log 50 enumerates fifteen logged changes to file A0.

FIG. 13 depicts the contents of synchronization log 37 for file C0.cvw. Lines 1 to 3 of FIG. 13 are similar to lines 1 to 3 of FIG. 12, except with values corresponding to file C0, session identifier 18S and last known sequence number 0040 with session identifier 18S. Line 4 is a record specifying a pointer to C0's parent file 1302 (i.e. A0.cvw), the session identifier associated with parent file A0 1304 (i.e. 16S), and an indicator 1308 indicating the synchronization position of parent file A0. Indicator 1308 may be an offset into A0's synchronization log. Indicator 1308 may used during the synchronization log entry exchange process and its purpose will further become apparent below. Lines 5 to 15 of FIG. 13 enumerate forty logged changes to file C0. Logged changes with sequence numbers 0000-0023 are identified as log entry group 1300.

FIG. 14 depicts the contents of synchronization log 52 for file C1.cvw. As explained previously, when copy C1 is created from copy C0, C0's synchronization log 37 is also copied to C1's synchronization log 52. Specifically, lines 1 to 3 of FIG. 14 specify that log 37 corresponds to file C1.cvw, edited with session identifier 13S with the last logged changes having sequence number 0030. Lines 4 and 5 are pointers to ancestors of C1. More specifically, line 4 is a pointer to C0, file C1's parent (and also indicates C1's session identifier and synchronization position), and line 5 is a pointer to file A0 (and also indicates A0's session identifier and synchronization position), C0's parent and file C1's grandparent. Lines 5 to 12 are group 1300 inherited from C1's parent's (i.e. copy C0) synchronization log 37. Remaining lines 14 to 18 are logged changes (sequence numbers 0000-0040) to C1.

As previously discussed, synchronization logs, for example, exemplary logs 50, 37 and 52 may be passed to synchronization log exchange software component 33. To synchronize two files, for example, files A0 and C1, the two files' logs, 50 and 52, may be processed by synchronization log exchange software 33 hosted on the descendant device (e.g. in this example, device 13) Synchronization log exchange software 33 parses each of logs 50 and 52 and effects the exchange of entries between the two logs 50 and 52 to achieve synchrony between files A0 and C1. As well, as each log is exchanged, the compressed cached version of a monitored file may be exchanged.

Figure 18:
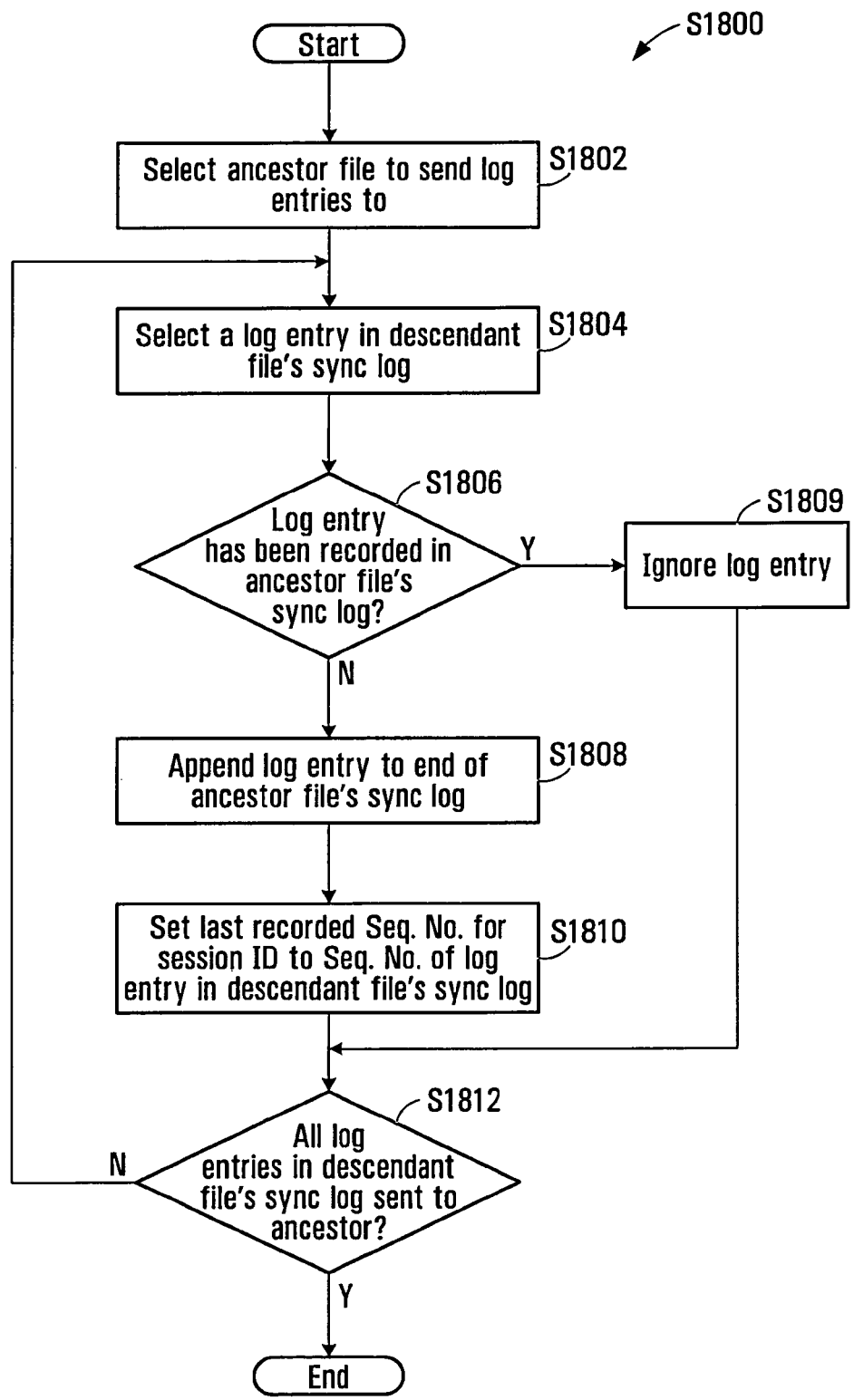
FIG. 18 is a flow diagram depicting the synchronization log exchange software component of FIG. 3 receiving and processing a log entry from another synchronization log such as the log entry of FIG. 9 or 10.
Figure 19:
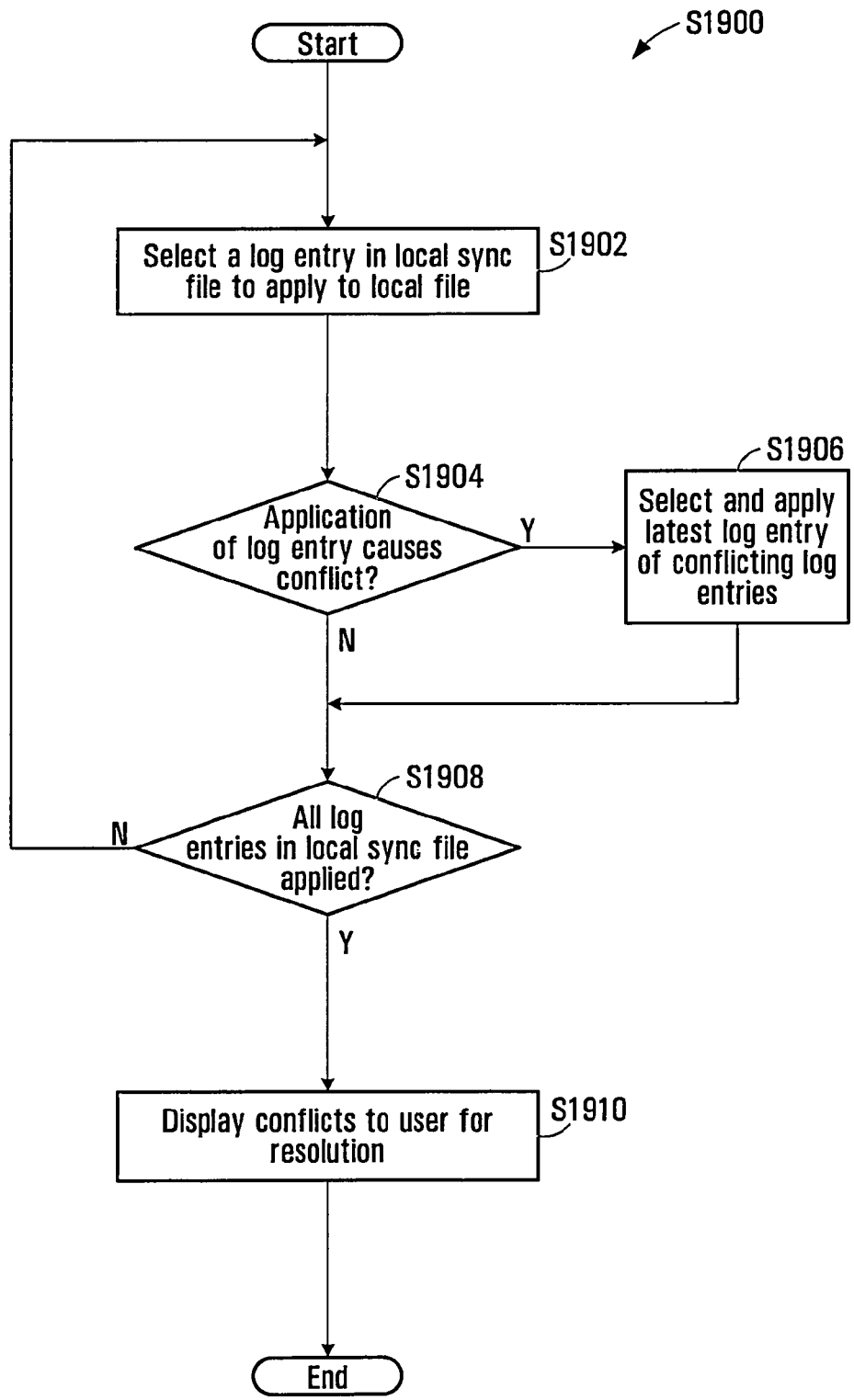
FIG. 19 is a flow diagram illustrating operation of the file update software of FIG. 3.
Figure 20:
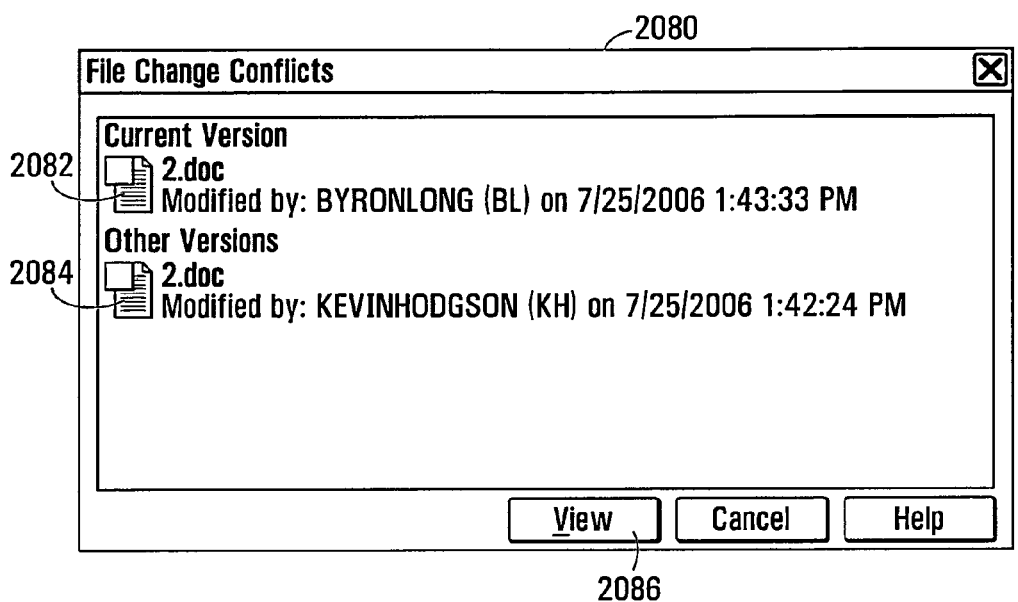
FIG. 20 is a screenshot of a graphical user interface (GUI) that may be presented to a user during operation of the file update software of FIG. 3.

The mechanics of exchanging log entries between logs 50 and 52 and thereby updating A0 with changes from C1 may be appreciated with reference to FIGS. 15A and 15B and flow diagrams S1800 (FIG. 18) and S1900 (FIG. 19).

FIGS. 15A and 15B depict log 50 belonging to file A0 and log 52 belonging to file C1. Log entries may be exchanged as follows: descendant (i.e. C1) may send its log entries up to its ancestor (i.e. A0) and may then obtain log entries from its ancestor's log.

FIG. 18 depicts operations carried out by log exchange software 33 hosted on device 13 where file C1 is stored. Log exchange software 33 may select and record qualifying log entries from log 52 hosted on device 13 and send them up to ancestor device 18 on which file A0 is hosted.

With reference to flow diagram S1800, and using log entry 1515 in log 52 as an example, log exchange software 33 on device 13 may send its log entries to (S1802) to file server 16—its ancestor, hosting file A0 and A0's log 50 (S1802). Only those log entries not already in log 50 need be exchanged. The last recorded sequence number for session identifier 18S may be set to "0000" (S1810). Log entries provided by the sender's (i.e. the descendant, file C1) log exchange software 33 is depicted in flow diagram S1800. Log exchange software 33 executing on device 13 may first select the ancestor file (i.e. A0) to send the log entries to (S1802). Next, a log entry in C1's log 52 may be selected (in this example, log entry 1515) (S1804). Log exchange software 33 may then determine if the selected log entry has been recorded in its ancestor's synchronization log (S1806). Log exchange software 33 may make this determination using the pointer field to ancestor file A0 in log 52, and in particular, by reading the synchronization position of the ancestor (value 1510 in log 52, FIG. 15A). Value 1510 may indicate the sequence number of the last log 52 log entry sent to A0's log 50. Since synchronization log 50 does not yet contain any log entries associated with session identifier 18S, the last recorded sequence number for session identifier 18S is not greater than the sequence number (i.e. 0000). If it is determined that the log entry has not been recorded in the ancestor file's log, then the log entry may be appended to the end of the ancestor file's log (S1808) (e.g. log entry 1515 appended to end of log 50, as shown in FIG. 15A and the last recorded sequence number for session identifier 18S set to "0000". If, however, it is determined that the log entry has been recorded in the ancestor file's log, then the log entry may be ignored (S1809). Qualifying log entries in the descendant's file may be sent up to the ancestor file's log until there are no more log entries to be sent (S1812).

Returning to FIGS. 15A and 15B, it may be noted that log entries 1500 originating from file A0's log 50 may also be added to descendant file C0's log 52 (FIG. 15B). Log entries 1501 originating from log 52 (and corresponding to the entries inherited by log 52 from its parent's, C0's log 37) may be sent up to log 50. Log entries 1502 originating from log 52 (and corresponding to modifications to local copy C1) may also be sent up to log 50. Once the exchange of log entries between logs 50 and 52 has been completed, logs 50 and 52 will contain the same entries, with all entries of log 50 contained in log 52, and all entries in log 52 contained in log 50. Of course, the order of the entries in each will typically be different as added entries may typically simply be appended.

As well, values 1504 and 1506 may be appended to the end of log 50. Value 1504 specifies that log 50 contains log entries with session identifier 13S up to sequence number 0030. Value 1506 specifies that log 50 also contains log entries with session identifier 18S up to sequence number 0023. Values 1504 and 1506 may be read by log exchange software 33 the next time a descendant of A0 synchronizes with A0 in order to determine whether log entries have already been entered into log 50. Moreover, it should also now be apparent how ancestor file A0's log 50 comes to receive log entries from its child file's log (i.e. C0's log entries) via another of its descendant's, more specifically, its grandchild, C1's log 52, without synchronizing with its child, C0.

The synchronization position of ancestor A0 in log 52 is also updated to "record_15", indicating that log 52 has received log entries 0000-0015 from A0's log 50. It may be appreciated that the synchronization position may be represented other than as a sequence number (e.g. offset in the log 52 file).

Finally, any cached copies 39 of any monitored files (e.g. non-database files A0 and C0) are exchanged between ancestor and descendant, so that each has a copy of the most recently cached copy of the monitored files at both descendant and ancestor.

FIGS. 16A and 16B shows file A0's log 50 (renamed 50'), after it has been updated by synchronization log exchange software 33 with log entries 1501 with session identifier 18S (i.e. modifications to its descendant, C0) and log entries 1502 with session identifier 13S (i.e. modifications to its subsequent descendant, C1).

FIGS. 17A and 17B show file A0's log 50' (renamed log 50") in the event A0's descendant. C0, subsequently synchronizes with A0 after C1 has synchronized with A0. Notably, modifications may have been made to file C0 after copy C1 was created. Therefore, corresponding log entries (log entries 1310) may not have been inherited by C1's log 52 from C0's log 37, and therefore, would not have been added to A0's synchronization log 50 when C1 synchronized with A0. Consequently, when C0 synchronizes with A0, synchronization log exchange software 33 may determine from component 1506 in log 50, that the largest sequence number logged in file 50 with session identifier 18S was 0023 and therefore, received log entries 0023-0040 with session identifier 18S has not yet been added to log 50. Log exchange software 33 may then add log entries 0023-0040 to log 50 and update component 1506 to "0040" to reflect the last logged sequence number with session identifier 18S.

To complete synchronization, newly added entries to a file's synchronization log may be applied to monitored files upon a triggering event. The triggering event may, for example, be the opening of the file to be updated, (e.g. file A0), by a user, which may consequently signal file update software 36. The triggering event may alternatively be the explicit execution by the user of file update software 36. Of course, other triggering events could equally be defined. Continuing with the above example, assume that file C1 first synchronizes with A0, and then file C0 subsequently synchronizes with A0. A0's synchronization log would look like log 50" (FIGS. 17A and 17B) after synchronization log exchange software 33 has completed its operations.

Upon a triggering event, file update software 36 hosted on device 16 may apply operations reflected in log 50" corresponding to new log entries to file A0. Methods for determining which log entries are "new" in file A0 (i.e. not yet applied to file A0) may be known to persons skilled in the art. For example, an offset value indicating the offset of the last log entry in log 50, applied to A0 may be maintained as part of the log file.

Flow diagram S1900 (FIG. 19) depicts operation of file update software 36. File update software 36, for example, hosted on device 16, may sequentially apply new log entries in log 50" (S1902). New log entries may be applied in order, based on their time stamps. File update software 36 may further determine if the application of a particular log entry will cause a conflict (S1904).

Various criteria for triggering conflicts may be defined as further detailed below. If the application of the selected log entry operation does not cause a conflict, then the log entry may be applied to file A0 (S1908). If application of the selected log entry would cause a conflict, the latest in time of the conflicting log entries, as determined from the timestamps of the log entries, may be applied to file A0 and the conflict marked for later resolution by the user (S1910).

For monitored files other than a database, only log entries reflecting a transferred cached version of the monitored file need be applied. Any transferred version of a monitored file may be used to replace the version of the logged file at an ancestor computing device, if the transferred (descendant) version reflects all changes to the file at the ancestor, since the file at the ancestor was transferred to the descendant (or to another ancestor of the descendant). To this end, as noted, only one cached copy of a particular monitored file is kept for each local copy of a monitored file. As well, each change is accompanied with a log entry including the checksum of the changed file, and the checksum of the file previous to the change (the "previous checksum"). As new entries in a log file are applied, only those entries that have a checksum of the file previous to the change corresponding to the most recently applied change are identified as not posing a conflict. Once the previous checksum for any file in the log no longer corresponds to the current checksum of the copy of the monitored file to be file, entries of the log will not effect further changes to this monitored file.

When a conflict is presented to a user for resolution, the most recent cached copy for each local copy is presented. Thus, it may be possible to have a plurality of cached copies of a monitored file originating from a plurality of local copies at a given device (provided, of course, that the devices hosting those other local copies have contacted the given device and provided their latest cached copies).

A set of rules may be provided to file update software 36, such that the violation of a rule triggers a conflict. For example, in the case of a database entry, a violation of a uniqueness constraint by the applied log entry may trigger a conflict. For example, as a consequence of synchronizing changes from two users, two different database records may have the same primary key. If the database schema dictates that primary keys must be unique, then this occurrence would trigger a conflict.

It may be appreciated that the application of a log entry reflecting a change to a monitored database differs somewhat than the application of a file change log entry to a monitored file. In the case of a database change log entry, values of the modified field may be provided in the log entry (e.g. see exemplary database log entry 1000, FIG. 10). Thus, the database operation giving rise to the log entry (e.g. database insert/change/delete transaction) may be replicated in the database being updated.

Once all log entries in log 50" have been applied to A0, all conflicts may be displayed to the user, for example, by way of graphical user interface (GUI) 2080 (FIG. 2). As illustrated, GUI 2080 displays two entries, entry 2082 and entry 2084 which cumulatively provide the information that two copies of file "2.doc" modified by two different people at two different times conflict. These conflicting versions may be cached copies of the most recent versions of the monitored file for each local copy. The user may be able to view each file by clicking on the "View" button 2086 and thereby select which version of file "2.doc" he or she prefers. Alternatively, the user may indicate through the GUI which version of the file he or she wishes to designate as the latest version (not shown). This selection may be indicated in the file's synchronization log as an "other" operation.

To prevent an accumulation of cached copies of files at a computing device, once a cached version of a file has been marked as the latest version for a given session identifier, previous cached versions of the file with the given identifier residing on a computing device may be discarded.

Application of new entries of a change log at a descendant to a descendant file may occur in a similar manner.

Of course, the above described embodiments are intended to be illustrative only and in no way limiting. The described embodiments of carrying out the invention are susceptible to many modifications of form, details and order of operation.

For example, it should be understood that the formats of log entries 90 and 1000 and of message operation 1100 depicted in FIGS. 9-11 are exemplary only. For instance, in FIG. 9, the fields of log entry 92 and file change parameters 97 are separated by tabs, however, other delimiters may be used (e.g. commas). Similarly, other arrangements of the fields and file change parameters in a synchronization log may equally be employed. It may be appreciated that the relative arrangement of the components of a synchronization log entry and indeed the arrangement of entries in a synchronization log is unimportant as long as synchronization log exchange software component 33 and/or file update software component 36, which read synchronization logs, are aware of the chosen format. Likewise, the values of the different fields and file change parameters in exemplary log entries 90 may be represented differently than as illustrated (for example, session identifiers are represented as a base-10 number, however, may be represented as a binary number; the date and time field may be represented in a format other than UTC, etc.) Likewise, the format of database log entry 1000 and message operation 1100 may differ from that illustrated in FIGS. 10 and 11. Moreover, the log format may be binary, delimited text, XML or other formats for particular network transports.

Moreover, not all fields shown in exemplary log entry 90 and database log entry 100 may be required. For example, in log entry 90, the strings "filename", "cache", "checksum", "oldchecksum" may be omitted entirely, leaving only the values of these fields, provided again that the application that file update software 36 and synchronization log exchange software 33 recognize, for example, that the value following the cache value is the checksum value, and the value following the checksum value is the oldchecksum value.

The invention rather, is defined by the claims.

What is claimed is:

1. A method of maintaining synchronism of a computer file at a first computer, said method comprising:
   providing a first version of said computer file from said first computer to a second computer;
   modifying at said second computer said first version of said computer file to create a second version of said computer file;
   maintaining a first change log at said second computer, reflecting changes resulting from said modifying at said second computer;
   sending said second version of said computer file and said first change log from said second computer to a third computer without sending said first change log to said first computer;
   at said third computer, receiving said second version of said computer file, and entries of said first change log from said second computer, to permit said second version of said computer file to be modified at said third computer, and to allow said third computer to relay said first change log to another computer;
   modifying at said third computer, said second version of said computer file, to create a third version of said computer file;
   maintaining a second change log at said third computer, reflecting changes resulting from said modifying at said third computer; and
   at said first computer, receiving, from said third computer, entries of said first change log received at said third computer, and entries of said second change log, and synchronizing said computer file at said first computer with said second and third versions of said computer file using received entries of said first change log and said second change log, thereby applying changes in said second version of said computer file and said third version of said computer file to said computer file at said first computer.

2. The method of claim 1, wherein said computer file comprises a database, and wherein said maintaining said first change log and said maintaining said second change log comprises logging changes to records of said database.

3. The method of claim 2, wherein said maintaining said first change log and said maintaining said second change log comprises monitoring writes to said database.

4. The method of claim 3, wherein said monitoring writes comprises logging an identifier of a field, a record being written to in said database and the value of said field of said record.

5. The method of claim 1, wherein said computer file comprises a data file created by an application, and further comprising maintaining a copy of said data file as most recently modified at said second computer, and maintaining a copy of said data file as most recently modified at said second computer.

6. The method of claim 5, wherein said maintaining comprises maintaining a checksum of said data file each time it is modified.

7. The method of claim 5, wherein said data file at said first computing device is replaced with said data file from said second computer if said data file from said second computer includes all changes to said data file at said first computer.

8. The method of claim 6, wherein each entry of said first and second change logs further includes at least one of a time stamp and a sequence number.

9. The method of claim 6, wherein said maintaining comprises generating a log entry at said second computer each time said file is updated, and wherein said log entry includes an identifier, identifying where said log entry was generated.

10. The method of claim 9, wherein said synchronizing comprises combining said first change log and said second change log.

11. The method of claim 10, wherein said combining comprises adding entries of said second change log to said first change log.

12. The method of claim 8, wherein said synchronizing comprises modifying said file at said first computer in accordance with recorded changes in said first change log and said second change log, wherein said recorded changes are applied in chronological order in dependence on their associated time stamp.

13. The method of claim 1, further comprising maintaining a change log at said first computer, reflecting changes to said file at said first computer.

14. A method of maintaining a computer file in synchrony between multiple computers, wherein said multiple computers comprise at least one ancestor, a descendant of said ancestor, and a subsequent descendant of said ancestor, wherein a local copy of said computer file is stored at said ancestor, said descendant and said subsequent descendant and a change log is maintained at said ancestor, said descendant, and said subsequent descendant, with each change log reflecting changes to local copies of said computer file;
and wherein said method comprises:
receiving at said descendant, entries of said change log reflecting changes to a local copy of said computer file made at said ancestor, and adding said entries to said change log at said descendant;
passing from said descendant to said subsequent descendant, entries of said change log at said descendant not yet passed to said subsequent descendant, including entries from said ancestor, for addition to said change log at said subsequent descendant without passing said entries of said change log not yet passed to said subsequent descendant from said descendant to said ancestor;
so that said subsequent descendant may pass to said ancestor, change log entries comprising changes made to local copies of said computer file at said descendant and said subsequent descendant, to synchronize said local copy of said file at said ancestor with said local copy of said file at said descendant and said local copy of said file at said subsequent descendant, thereby applying changes reflected in entries of said change log at said descendant and said subsequent descendant to said computer file at said ancestor.

15. The method of claim 14, wherein said change log at each of said ancestor, descendant and subsequent descendant includes a plurality of entries each reflecting a change to said file, and wherein each entry includes an identifier of a computer at which the change was made.

16. The method of claim 15, wherein each entry of said change log further comprises at least one of a time stamp, or a sequence number.

17. The method of claim 16, wherein said file comprises a database, and wherein at least some of said entries each reflect changes to a record of said database.

18. The method of claim 16, wherein changes to said file recorded in said change log may be applied chronologically at said ancestor, based on said time stamp or said sequence number, in order to synchronize said file.

19. The method of claim 14, further comprising receiving at said descendant, entries of said change log reflecting changes to a local copy of said computer file made at said subsequent descendant, and adding said entries to said change log at said descendant.

20. Persistent computer readable medium storing processor executable instructions that when loaded at a computing device comprising a processor, cause said computing device to perform the method of claim 14.

21. A method comprising:
storing a first version of a computer file at a server;
providing said first version of said computer file to a first portable computing device;
modifying said first version of said computer file at said first portable computing device to create a second version of said computer file;
maintaining, at said first portable computing device, a first log reflecting modifications made to said first version of said computer file at said first portable computing device;
providing said second version of said computer from said first portable computing device to a second portable computing device;
providing entries of said first log maintained at said first portable computing device reflecting modifications made to said first version of said computer file at said first portable computing device, to said second portable computing device from said first portable computing device without providing said entries at said first log from said first portable computing device to said server;
making further modifications to said second version of said computer file at said second portable computing device to create a third version of said computer file;
maintaining a second log reflecting said further modifications at said second portable computer device;
transferring from said second portable computer device to said server, log entries comprising entries of said first log and entries of said second log, to allow said server to synchronize said first version of said computer file to reflect aggregate changes made at both said first portable computing device and said second portable computer device.

22. The method of claim 21, further comprising
additionally modifying said second version of said computer file at said first portable computing device after having provided said second version of said computer file to said second portable computing device;
maintaining, at said first portable computing device, a log reflecting modifications made as a result of said additionally modifying;
providing log entries reflecting modifications made as a result of said additionally modifying from said first portable computing device to said server.

23. The method of claim 22, further comprising using said log entries transferred from said second portable computer device to said server, and said log entries transferred from said first computing device to update said first version of said computer file at said server to reflect aggregate changes made at both said first portable computing device and said second portable computer device.

\* \* \* \* \*